United States Patent [19]

Davis

[11] Patent Number: 4,619,167
[45] Date of Patent: Oct. 28, 1986

[54] ADJUSTABLE CIRCULAR INSULATION SAW SYSTEM

[76] Inventor: Harry C. Davis, 8993 Airline Hwy., Baton Rouge, La. 70815

[21] Appl. No.: 582,315

[22] Filed: Feb. 22, 1984

Related U.S. Application Data

[60] Division of Ser. No. 310,962, Oct. 13, 1981, Pat. No. 4,466,170, which is a continuation-in-part of Ser. No. 63,743, Aug. 6, 1979, Pat. No. 4,295,263.

[51] Int. Cl.$^4$ .......................... B23D 3/02; B23D 57/00
[52] U.S. Cl. ........................................ 83/607; 29/557; 83/875; 408/54
[58] Field of Search ................ 83/635, 607, 662, 875, 83/961, 761, 469, 608; 29/561, 564, 557, 33 R

[56] References Cited

U.S. PATENT DOCUMENTS

| | | | |
|---|---|---|---|
| 740,727 | 10/1903 | Wissman | 408/54 |
| 2,751,941 | 6/1956 | Smith | 408/54 |
| 2,780,896 | 2/1957 | Jaye | 408/54 X |
| 2,841,193 | 7/1958 | Petrofsky | 408/54 X |
| 2,983,175 | 5/1961 | Harris | 83/635 |
| 3,060,779 | 10/1962 | Taft | 83/607 |
| 3,312,131 | 4/1967 | Gilmore | 29/557 |

*Primary Examiner*—William R. Briggs
*Attorney, Agent, or Firm*—Pravel, Gambrell, Hewitt & Kimball

[57] ABSTRACT

A machine for cutting insulation material into semicircular blocks. Circular cutting blades of different diameter and thickness are mounted reciprocally on a support shaft.

6 Claims, 6 Drawing Figures

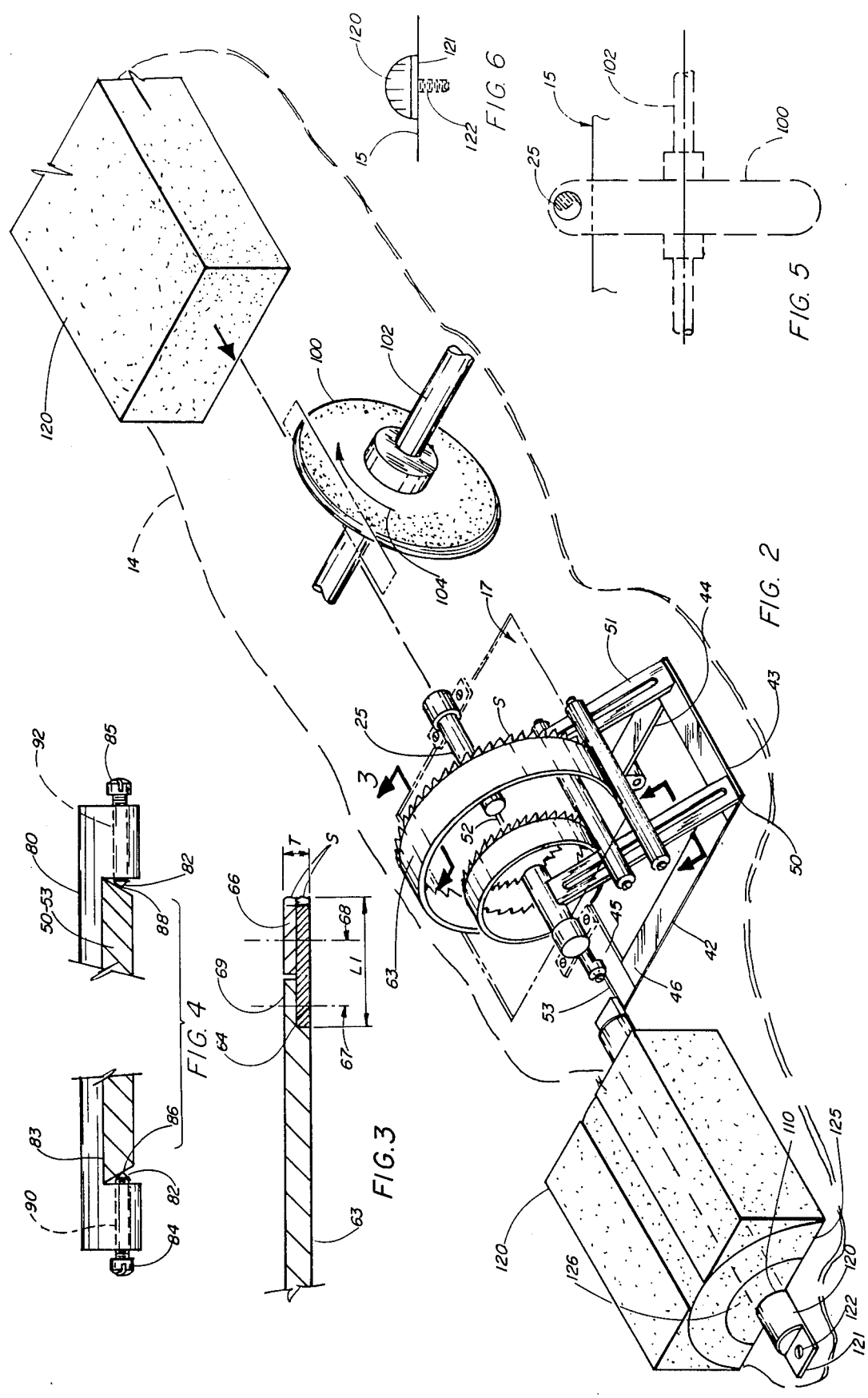

ADJUSTABLE CIRCULAR INSULATION SAW SYSTEM

This is a division of application Ser. No. 310,962, filed Oct. 13, 1981, entitled "Adjustable Circular Insulation Saw System" now U.S. Pat. No. 4,466,170 which is a continuation-in-part of U.S. Ser. No. 063,743 filed Aug. 6, 1979, entitled "Circular Insulation Saw System" which is now U.S. Pat. No. 4,295,263 which issued Oct. 20, 1981.

DESCRIPTION

1. Technical Field

The Present invention relates to insulation cutting devices, and more particularly relates to an improved rotary type insulation cutter. Even more particularly, the present invention provides a rotary insulation cutting device having an improved cutter and router assembly which cooperate to form semicircular insulation members for use with pipe. Even more particularly, the present invention provides an improved reciprocal rotary insulation cutting system having an adjustability allowing interchangeability of blades of varying diameters.

2. General Background

In the industrial piping field, it is often required that individual runs of pipe be insulated to either preserve their heated or cooled condition, or to prevent injury to persons working near the pipes from burn and the like. The industry has developed a foam glass type insulation which is commercially available in usually block form and is known in the art, and is widely used commercially. The foam blocks are usually uniform in shape being generally rectangular and available from a number of commercial sources.

Since fluid conveying members are generally circular, such as conventional piping, a need exists for a cutting apparatus which can transform the rectangular block of foam glass members into semicircular insulation members (see FIG. 2 in the drawings).

Many prior art type devices which do utilize a circular cutting member or cutting assembly do not have the cutting assembly firmly braced so that a true and precise cut is made.

It would be desirable to provide a circular cutting member or cutting assembly or a cutting blade which would firmly mounted at the location where the cutting is to take place. It would further be desirable that the cutting blade be easily manufactured in a variety of sizes and diameters and further that interchangeability of different blades of different sizes be easy to perform on a given overall apparatus. This would allow a workman who was cutting the blocks of insulation material to interchange blades as required with a minimum of time to obtain semicircular pipe insulation block members of different sizes depending upon the size pipe to be insulated.

Many prior art type devices are available which perform the cutting task in transforming rectangular blocks of foam glass material into generally semicircular insulation members which can be affixed to circular pipe structures. Some of these prior art type devices utilize a mandrel and elongated band saw type cutting arrangements. Such devices require skilled operators to properly mount the foam glass blocks on the mandrel and thereafter oversee the turning of the foam glass block on the mandrel and its cutting by a blade structure.

Further, many types of mandrel and blade arrangements provide a plurality of blades to cut a plurality of semicircular insulation members from a single foam glass block, see for example, U.S. Pat. Nos. 4,059,035 and 4,140,036.

J. L. Williams in U.S. Pat. No. 3,941,018 teaches the use of a machine for cutting fiberglass boards having an impermeable barrier such as foil on one of its face. The blades are arranged in tandem with one of the blades cutting above a support roller, or both of the blades cut between a pair of support rollers. When the fiberglass board moves through the machine, the loading edge of the foil is bend down and a knife edge is inserted between the foil and remainder of the board.

Rotary type of circular saws are also known. Prior art type rotary saws are provided which generally attach the problem of cutting the foam glass block by providing a circular blade shaped to conform to the outer diameter of the pipe to which the insulation member will thereafter be fitted.

U.S. Pat. No. 3,060,779 issued to P. M. Taft and entitled "Cutting Apparatus" provides such a rotary type saw for cutting block type insulation material suitable for covering pipe, tanks, cylinders, tubes, and other circular type structures. The Taft device (U.S. Pat. No. 3,060,779) utilizes a plurality of circular blades, which are reciprocally driven from a linkage and belt member. Several blades are provided for cutting a number of insulation members from a single block of material.

In U.S. Pat. No. 2,841,193 issued to P. E. Petrofsky, there is provided a machine for sawing sponge-like cellular glass. In that patent, a circular blade is reciprocally driven from a belt drive motor with a pair of circular blades performing the cutting. The device also teaches the cutting of elbow members, as shown in FIGS. 6–9.

In U.S. Pat. No. 2,751,941 issued to E. S. Smith, and entitled "Tubular Power Saw", a rotary saw blade is supported by roller bearings which are motor driven. The saw is truly rotary rather than reciprocal as the above-mentioned references.

In U.S. Pat. No. 2,983,175 issued to B. B. Harris, and entitled "Foam Glass Shaping Device", the device provides circular blades which are vibrated with the vibration being translated to the blade in order to cut the rigid but brittle foam glass material.

U.S. Pat. No. 3,312,131 provides another insulation forming device. The patent is issued to G. T. Gilmore and entitled "Insulation Forming Device", and provides a circular saw mounted on roller bearings which support the saw blade itself.

U.S. Pat. No. 2,780,896 issued to R. C. Jaye and entitled "Apparatus for Cutting Pipe Cover Sections from Cellular Material" provides a rotary cutting blade which is supported by rollers and belt driven with a motor. Recesses are provided in the cutting blade to accommodate the belt. The device suffers in that the blade must be thick enough to accommodate the thickness of the drive belt. Thus, greater friction and excessive material cut thickness is required.

G. F. Wissman in Pat. No. 740,727 discloses a head-block-sawing machine for cutting pieces of timber in the shape of a quarter-circle comprising a cylinder saw, a pair of oppositely-placed longitudinally-ajustable bits mounted on the inner surface of the saw for trimming the edge of the material while it is being cut, a stationary block-holder with two side plates extending at a right angle to each other, a slidable clamping head in the holder, and a spring controlled clamping arm to hold the block being cut.

British Pat. No. 844,230 discloses a saw machine for cutting of workpieces of semicircular cross-section comprising a headstock with a rotatable driver mounted on a supporting frame and arranged for the clamping of the rear end of a tubular cutter, the free end face of which has a cutting edge facing a rest, which supports material being cut and which is inclined in relation to the axis of the cutter.

Prior art devices usually support the cutting assembly or blade itself at the periphery thereof usually by roller bearings or a pivoting arm. These and other prior art devices suffer in that they do not provide a true cut of the insulation foam glass material, especially of the inner recess portion of the smallest cut which must fit closely to small diameter pipe.

GENERAL DISCUSSION OF THE PRESENT INVENTION

The present invention provides an insulation material cutting assembly comprising a frame with a material feed surface being supported by the frame. The frame provides fore and aft material feed surface areas, with a circular cutting blade movably mounted on the feed surface and providing fore and aft cutting edges. The circular cutting saw can be placed generally between the fore and aft material feed surface. A router in the form of preferably one routing wheel is movably mounted on the table for routing a semicircular groove in a block of insulation material to be cut, preferably as the insulation block travels from the fore or aft material feed surface to the circular cutting blades.

An adjustable carriage holding the circular blade provides an adjustability allowing different diameter blades to be placed on the carriage for cutting semicircular blocks of insulation material of varying diameter and thickness. In the preferred embodiment, the adjustable carriage provides a generally triangularly shaped frame having a base and slanted side strut portions attached at their lower ends to the edges and which meet at their uppermost tip, joining to a provided shaft. The upwardly extending side strut portions of the carriage can be bevelled at the edges with preferably two cross bars being slideably movable upon the carriage and having, for example, set screws for forming rigid attachment of the cross bars to the carriage at desired positions. The circular blades attach to the cross bars in a rigid but removable fashion using, for example, assembly bolts.

In the preferred embodiment, the circular cutting assembly provides a pair of circular blades which are mounted on the blade carriage at the feed table surface by the shaft which is rotatably supported at the feed table fore and aft of an opening in the table through which the circular blades project. The blade carriage and attached blades are reciprocally driven during the cutting operation.

The router provides a routing surface which projects above the feed surface an area at least as great as the shaft upon which the circular cutting blades are mounted. In operation an insulation block to be cut will first be fed across the router wheel before engaging the circular cutting blades. An innermost recess will be cut in the block before it reaches the saw assembly, with the recess passing through the cutting assembly at the shaft portion thereof.

It is therefore an object of the present invention to provide a more positive cutting assembly which utilizes a cutting router in cooperation with a shaft mounted circular rotary cutting blade, with the router first cutting a groove recess in the material block before the block engages the cutting assembly, with the recess passing the area occupied by the cutting assembly shaft.

It is another object of the present invention to provide an insulation material cutting apparatus which is simple and easy to manufacture and maintain.

It is another object of the present invention to provide an adjustable cutting assembly which allows cutting blades of different diameters to be quickly and easy interchanged to allow blocks of insulation material to be cut of different diameters and thicknesses.

BRIEF DESCRIPTION OF THE DRAWINGS

For a further understanding of the nature and objects of the present invention, reference should be had to the following detailed description, taken in conjunction with the accompanying drawings, in which like parts are given like reference numerals and wherein:

FIG. 2 is an exploded perspective view of the preferred embodiment of the apparatus of the present invention;

FIG. 3 is a sectional view taken along lines 3—3 of FIG. 2;

FIG. 4 is a sectional schematic view of the blade holder portion of the preferred embodiment of the apparatus of the present invention;

FIG. 5 is a sectional view of the router and shaft portions of the preferred embodiment of the apparatus of the present invention;

FIG. 6 is a sectional view of the guide bar portion of the preferred embodiment of the apparatus of the present invention.

BEST MODE FOR CARRYING OUT THE INVENTION

Figure 1:
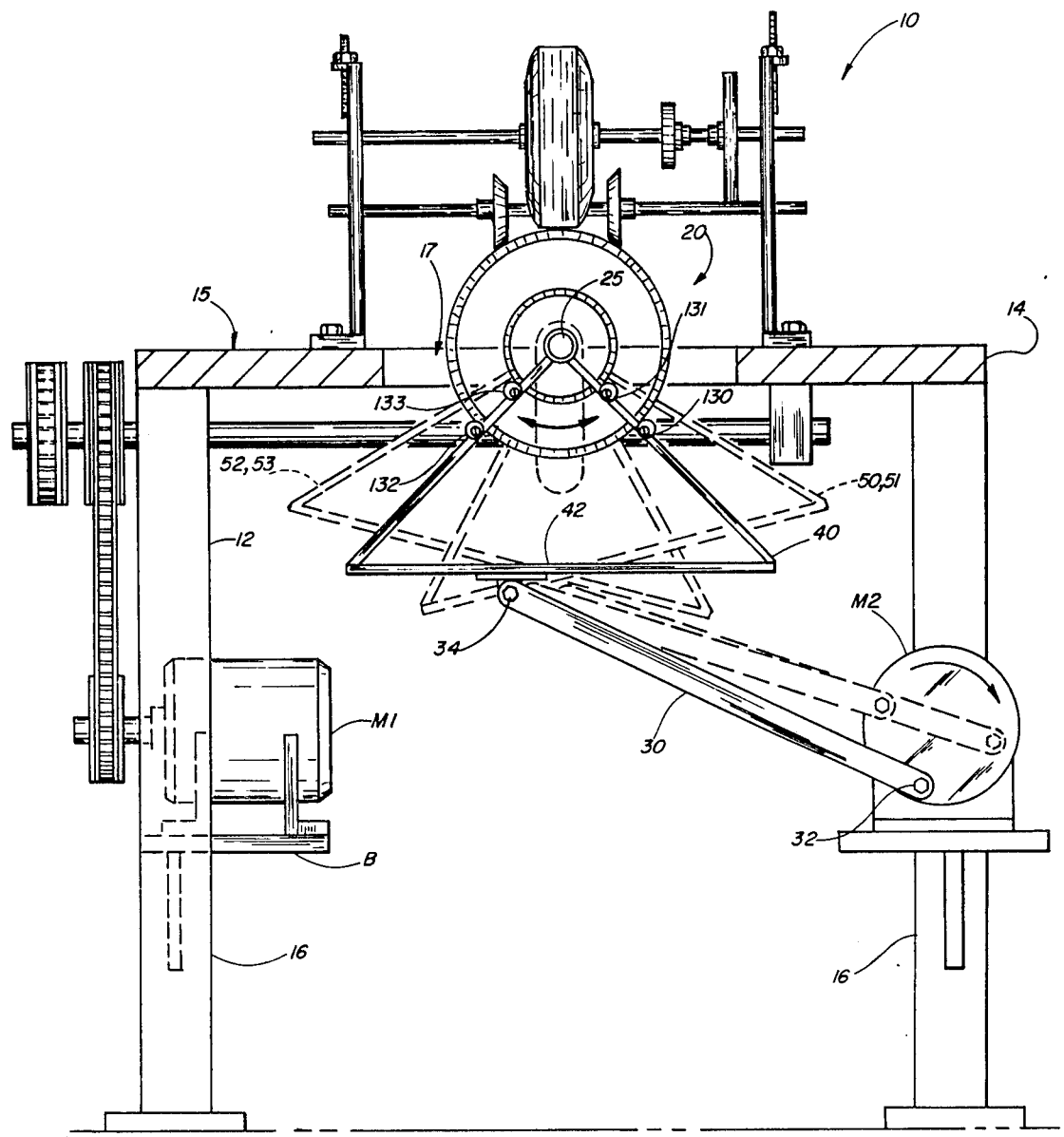
FIG. 1 is a sectional elevational view of the preferred embodiment of the apparatus of the present invention.

FIGS. 1 and 2 illustrate the preferred embodiment of the apparatus of the present invention designated generally by the numeral 10.

Apparatus 10 provides a supportive frame 12 which could be, for example, in the form of a table as shown in FIG. 1 having an upper work surface 14 portion supported by a plurality of legs 16 with an upper preferably flat surface 15 being provided with an opening 17 therein.

Supported in opening 17 would be cutting assembly 20 which would be mounted by means of shaft 25 to table surface 14 at opening 17 with the end portions of shaft 25 attaching respectively at opposite sides of opening 17. Note from FIG. 1 that shaft 25 could have its center or its central axis substantially coincident with the flat plane upper surface 15 of frame 12. A feed system would provide a motor M1 supported by a suitable bracket B and having linkage L which would be used to convey a blocks 120 of material to be cut to cutting assembly 20. The construction of the feed assembly as schematically shown in FIG. 1, and is more particularly described in my prior copending Patent Application, U.S. Ser. No. 063,743 now U.S. Pat. No. 4,295,263, which was filed on Aug. 6, 1979, which application is incorporated herein by reference.

A second motor M2 supported by its bracket B2 would be provided with an elongated link arm 30 with link arm 30 attaching at one end portion (32) to motor M and at its other end portion at 34 to blade carriage assembly 40.

The construction of blade carriage 40 and of cutting assembly 20 is best seen in FIG. 2 in perspective. Carriage 40 comprises a base 42 which could provide four beams 43-46 connected respectively at their end portions to form the rectangular base 42 shown in FIG. 2.

Extending upwardly in an angular fashion and each forming angles with base 42 are a plurality of side struts 50-53. Each strut 50-53 would attach at one end portion to base 42 and at its other end portion to shaft 25.

Shaft 25 can be discontinuous, being open at its central portion as best seen in FIG. 2 allowing the insertion from above of blades 60-62 (as will be described more fully hereinafter) for their attachment to carriage 40 at cross bars 80, with a pair of cross bars 80 being provided for each blade 60-26 to be mounted on carriage 40.

Each blade 60-62 would be cylindrical and would be attached to carriage 40 as will be described more fully hereinafter so that the central axis of each cylindrical blade assembly 60-62 would coincide with the central axis of shaft 25. Each blade assembly 60-62 would comprise a blade holder 63 having at one end portion a grooved annular recess 64 which would be, for example, of a thickness equal approximately to one-half the thickness of blade holder 63. Two blades 65-66 (each having serrated cutting edges S, for example, to cut the insulation material being cut) could thus be attached to blade holder 63. Lines 67-68 in FIG. 3 illustrate schematically the point of attachment of fasteners (such as e.g., machine bolt and nut connections) which would pass in a first instance through blade 65 and blade holder 63 at the narrowed tip 69 portion thereof. This first fastening as indicated by the numeral 67 in FIG. 4 would attach blade 65 (having a greater cylindrical length L-1) to holder 63. Thereafter a second connection would be formed as indicated by the numeral 68 in FIG. 4 between longer blade 65 and a shorter blade tip 66. Thus, a cutting edge of thickness T would be provided which would substantially equal the thickness T of blade holder 63. From the above, one will appreciate that cutting would be provided a thickness "T" equal approximately to the thickness of blade holder 63. Blade holder 63 would preferably be cylindrical and continuous being manufactured, for example, from a section of pipe of the same diameter and schedule as the pipe to be insulated by the arcuate insulation sections being cut by apparatus 10.

The attachment of each cutting blade 60, 62 to carriage 40 will be described more fully with respect to FIGS. 2 and 4. Each cross bar 80 at its end portion is rounded in cross section but at its central portion provides a .cutout 82 having flat surface 83 which fits against struts 50-51 or struts 52-53. During operation the cutout 82 would provide a point for attachment of cross bar 80 to struts 50, 51. Set screws 84, 85 could attach rigidly each cross bar 80 to its respective strut 50-53. Struts 50-53 could be bevelled at their outside edges as indicated by the numerals 86, 88.

Set screws 84, 85 could be threaded and cross bar 80 could be provided with threaded openings 90, 92 with rotational movement of each respective set screw 84, 85 in its respective threaded opening 90, 92 effecting a tightening or loosening of cross bar against its respective pair of struts 50-51 or 52-53.

Each cross bar 80 could thus be loosened with respect to its pair of struts 50-51 or 52-53 and moved linearly upwardly and downwardly as desired to a desired position. In this fashion, each cross bar 80 could be adjusted to a desired position which would allow adjustability with regard to different sizes of blades 60-62 which might be attached to carriage 40. Marked indicia could be provided on each strut 50-53 so that a cross bar 80 could be lined up with the indicia provided on the respective strut 50-53 to indicate a certain diameter blade. In this way cross bar 80 could be preset depending on the size blade desired.

A router 100 being rotatable upon shaft 102 is seen in FIG. 2 with arrow 104 indicating a rotational movement during operation. Router 100 would outcrop above surface 15 a distance sufficient to route a groove 110 in block 120 prior to the cutting of block 120 by blade assemblies 60-62. The groove formed would be preferably larger than the cross section of shaft 25, eliminating any drag between shaft 25 and block 120 during cutting, this feature is schematically seen in FIG. 5. In FIG. 2, block 120 can be seen cut into a pair of half cylindrical arcuate insulation members 125, 126. The rigid connection of each blade 60-62 to carrier 40 would be, for example, by means of a bolted connection with bolted connections being shown as 130-133 in FIG. 2.

A guide bar 120 is illustrated in FIGS. 2 and 6. Guide bar 120 would be a half-cylindrical section mounted on the feed surface 15 and preferably axially aligned with the central axis of shaft 25. End tabs 121 could be provided which would allow attachment of guide bar 120 to feed surface 15 by means of tapping screws 122 or the like.

Guide bar 120 would preferably be substantially equal in cross-sectional size to the groove 110 milled in the bottom of block 120 by router 100. The block 120 being cut would be received by guide bar 120 immediately upon exit from cutting assembly 20. This would enhance a true cut as the block proceeds through saw butting assembly 20 during operation.

Because many varying and different embodiments may be made within the scope of the inventive concept herein taught, and because many modifications may be made in the embodiments herein detailed in accordance with the descriptive requirement of the law, it is to be understood that the details herein are to be interpreted as illustrative and not in a limiting sense.

What is claimed as invention is:
1. A circular cutting blade apparatus comprising:
 a. a cylindrical blade holder comprising an endless cylindrical band having a substantially uniform thickness;
 b. an annular groove being provided on said cylindrical band and having a generally uniform cross section about the periphery of said band;
 c. a first toothed cutting blade attached to said cylindrical band at said groove; and
 d. a second toothed cutting blade having a thickness substantially equal to the thickness of said blade holder less the thickness of said first blade, the first and second blades being affixed together with the toothed portions of the blades being positioned adjacent one another during cutting.

2. A circular insulation saw for cutting blocks in insulation material comprising:
 a. a cylindrical blade holder having at least one edge;
 b. a first cutting blade secured to the edge of the cylindrical holder and extending a distance circumferentially therearound;

c. a second cutting blade having a thicker width than the first blade; and d. means for securing the first and second cutting blades together upon the blade holder in a position adjacent the edge.

3. The apparatus of claim 2 wherein said pair of blades are each provided with saw toothed edge portions.

4. The apparatus of claim 2 wherein said blade holder comprises a cylindrical blade holder body and a recess extending about said blade body at one end portion thereof with one of said blades occupying said recess and being attached to said blade holder at said recess with the second of said blades being attached during operation to said first blade.

5. The apparatus of claim 2 further comprising connection means for connecting each of said blades with said blade holder.

6. The apparatus of claim 2 wherein said blade holder is cylindrical and provides a thickness substantially equal to the combined thicknesses of said pair of blades.

* * * * *